(12) United States Patent
Yoshioka et al.

(10) Patent No.: US 6,244,454 B1
(45) Date of Patent: Jun. 12, 2001

(54) MULTILAYER THIN WALL CONTAINER

(75) Inventors: Tsunemi Yoshioka; Hiroshi Morisaki, both of Toyama (JP)

(73) Assignee: Hanshin Kasei Co., Ltd., Toyama-ken (JP)

( * ) Notice: Subject to any disclaimer, the term of this patent is extended or adjusted under 35 U.S.C. 154(b) by 0 days.

(21) Appl. No.: 09/485,595

(22) PCT Filed: Sep. 22, 1999

(86) PCT No.: PCT/JP99/05195

§ 371 Date: Apr. 13, 2000

§ 102(e) Date: Apr. 13, 2000

(87) PCT Pub. No.: WO00/48913

PCT Pub. Date: Aug. 24, 2000

(30) Foreign Application Priority Data

Feb. 18, 1999 (JP) .................................................. 11-039934

(51) Int. Cl.$^7$ ........................................................ B65D 1/44
(52) U.S. Cl. ........................ 220/62.22; 220/671; 220/675; 215/12.2
(58) Field of Search ............................. 220/62.22, 62.11, 220/671, 675, DIG. 12; 215/12.2; 428/36.91

(56) References Cited

U.S. PATENT DOCUMENTS

| | | | |
|---|---|---|---|
| 3,082,900 | * | 3/1963 | Goodman . |
| 3,398,428 | | 8/1968 | Fuerst et al. . |
| 3,869,056 | | 3/1975 | Valyi . |
| 4,307,137 | | 12/1981 | Ota et al. . |
| 4,868,026 | * | 9/1989 | Shimizu et al. ................ 428/36.7 |
| 4,912,048 | * | 3/1990 | Smith et al. .................. 435/299.2 |
| 4,943,458 | * | 7/1990 | Buecheler ..................... 428/35.7 |
| 5,116,565 | | 5/1992 | Yoshino . |
| 5,447,678 | | 9/1995 | Kneer et al. . |
| 5,688,570 | * | 11/1997 | Ruttinger, Sr. . |
| 5,849,224 | * | 12/1998 | Valyi ............................. 264/37.31 |
| 5,888,636 | | 3/1999 | Asanuma et al. . |
| 6,068,900 | * | 5/2000 | Kohn et al. .................... 428/35.7 |

FOREIGN PATENT DOCUMENTS

| | | |
|---|---|---|
| 19601658A1 | 7/1996 | (DE) . |
| 0182094A2 | 5/1986 | (EP) . |
| 0281776A2 | 9/1988 | (EP) . |
| 0370695A2 | 5/1990 | (EP) . |
| 0499216A1 | 8/1992 | (EP) . |
| 0532873A1 | 3/1993 | (EP) . |
| 0770644A1 | 5/1997 | (EP) . |
| 2725958A1 | 4/1996 | (FR) . |
| 10167244A | 6/1998 | (JP) . |

* cited by examiner

Primary Examiner—Stephen Castellano
(74) Attorney, Agent, or Firm—Nixon & Vanderhye (57) ABSTRACT

A multilayered thin container (1) comprises a cylindrical body (2) and a neck or mouth portion (3) for cap-fitting which is integrally formed by extrusion and blow-molding, and comprises an outer layer (A) composed of a high-rigidity resin (i) having an elastic modulus of 2,000 to 23,000 kg/cm$^2$ and an inner layer (B) composed of a low-rigidity resin (ii) having an elastic modulus of not more than 1,000 kg/cm$^2$. When extruding to form the parison, the amount of the high-rigidity resin (i) extruded for a portion corresponding to the neck portion (3) is increased as compared to that corresponding to the cylindrical body (2), so that the neck portion (3) can be set to a higher rigidity than that of the cylindrical body (2). Further, the outer layer (A) composed of the high-rigidity resins (i) is extruded into a sectional shape with a plurality of protrusions arranged in the circumferential direction, whereby the cylindrical body (2) is formed with a plurality of ribs (21) composed of the high-rigidity resins (i) and extending along an axis thereof.

8 Claims, 7 Drawing Sheets

I-I
CROSS-SECTIONAL VIEW

IV–IV
CROSS-SECTIONAL VIEW

MULTILAYER THIN WALL CONTAINER

TECHNICAL FIELD

The present invention relates to a multilayered thin container, and more particularly, to a novel multilayered thin container including a flexible cylindrical body and a high-rigidity neck portion on which a cap is to be fitted and which is integrally formed with the cylindrical body by a blow-molding method, and being suitable as transfusion containers, food containers, beverage containers or the like.

BACKGROUND ART

As medical transfusion containers, for example, various thin-walled containers whose body is produced from relatively flexible resins by a blow-molding method, have been proposed and used instead of so-called conventional transfusion bags produced by forming a film material into a flat bag. Alternatively, since such containers are extremely easy in handling, these thin-walled containers are deteriorated in liquid-discharging property and easy collapse property as compared to the transfusion bags, because these containers have a relatively high rigidity as a whole and a solid structure. Also, the transfusion containers have been required to be closed by fitting a cap on a neck (or mouth) portion thereof. For this reason, the neck portion of the thin-walled container is usually formed by welding a reinforcing neck member to the neck portion in a separate step after forming a container body, or by inserting such a neck member to the neck portion when blow-molding to produce the container body.

Incidentally, the conventional thin-walled containers have been produced using complicated production apparatuses or processes since it is necessary to use the separate neck member produced in the separate steps. Further, there arises such a problem that a portion of the container to which the neck member is fitted, tends to undergo pin holes. Accordingly, the present invention has been attained to solve these problems. An object of the present invention is to provide a novel multilayered thin container comprising a cylindrical body and a neck portion for cap-fitting, which exhibits a more excellent liquid-discharging property and easy collapse property, which is surely prevented from undergoing pin holes in the base portion of the neck for cap-fitting, and which can be produced by a much simpler process.

DISCLOSURE OF THE INVENTION

In order to accomplish the above-described object, in accordance with the present invention, there is provided a multilayered thin container comprising a cylindrical body and a neck portion for cap-fitting, which container is integrally produced by extrusion and blow molding, which container comprises an outer layer composed of a high-rigidity resin (i) having an elastic modulus of 2,000 to 23,000 kg/cm$^2$ and an inner layer composed of a low-rigidity resin (ii) having an elastic modulus of not more than 1,000 kg/cm$^2$, wherein when extrusion-molding to form a parison, the amount of the high-rigidity resin (i) extruded for a portion corresponding to the neck portion is increased as compared to that corresponding to the cylindrical body so as to allow the neck portion to exhibit a higher rigidity than that of the cylindrical body; and the outer layer composed of the high-rigidity resin (i) is extruded into a sectional shape with a plurality of protrusions arranged in the circumferential direction, whereby the cylindrical body is formed with a plurality of ribs composed of the high-rigidity resin (i) and extending along an axis thereof.

That is, in the above multilayered thin container, such a structure in which the neck portion has a higher rigidity than that of the cylindrical body, enables the cylindrical body to maintain a good flexibility and the cap to be fitted onto the neck portion. Also, the parison extruded into the specified shape can be enhanced in moldability upon the blow-molding process, since the parison itself exhibits a high shape-retention property due to the ribbed structure constituted by the protrusions formed on the outer layer composed of high-rigidity resin. Further, by forming the ribs composed of high-rigidity resin on the cylindrical body of the blow-molded container, it is possible to impart a rigidity required when filled, to the cylindrical body. Accordingly, the cylindrical body can be further reduced in thickness of a portion other than the ribs, thereby enabling a liquid-discharging property and an easy collapse property of the container to be further enhanced.

In the above multilayered thin container, in order to enhance a setting stability and a standing property thereof, it is preferred that when extrusion-molding to form the parison, the amount of high-rigidity resin extruded for a portion corresponding to a bottom portion of the container is increased as compared to that corresponding to the cylindrical body so as to allow the bottom portion to exhibit a higher rigidity that of the cylindrical body.

In the preferred embodiment of the above multilayered thin container, the thickness of the cylindrical body is 0.3 to 2.0 mm. In addition, the thickness of the outer layer composed of high-rigidity resin at the neck portion is 20 to 99% based on the whole thickness of the neck portion, and the thickness of the outer layer composed of high-rigidity resin at the cylindrical body is 1 to 50% based on the whole thickness of the cylindrical body.

In the further preferred embodiment of the above multilayered thin container, the high-rigidity resin is polyethylene having a melt flow rate (MFR) of 0.10 to 2.0 g/10 min and a density of 0.940 to 0.970 cm$^3$/g, or low-density polyethylene or linear low-density polyethylene having a melt flow rate (MFR) of 0.2 to 4.0 g/10 min and a density of 0.925 to 0.940 cm$^3$/g; and the low-rigidity resin is polyethylene produced using a metallocene catalyst and having a density of 0.860 to 0.910 cm$^3$/g or a polyethylene resin containing the polyethylene produced using a metallocene catalyst in an amount of not less than 50% by weight.

Further, in the above multilayered thin container, the high-rigidity resin may include polypropylene having a density of 0.885 to 0.935 cm$^3$/g; and the low-rigidity resin may include polyethylene produced using a metallocene catalyst and having a density of 0.860 to 0.910 cm$^3$/g or a polyethylene resin containing the above polyethylene in an amount of not less than 50% by weight.

Furthermore, in the above multilayered thin container, a gas-barrier layer composed of a gas-barrier resin may be further provided in order to prevent oxygen from being permeated therethrough. In the preferred embodiment of the multilayered thin container provided with the gas-barrier layer, the gas-barrier resin may be selected from ethylene-vinyl alcohol copolymer, polyamide and polyethylene naphthalate.

BEST MODE FOR CARRYING OUT THE INVENTION

Figure 1:
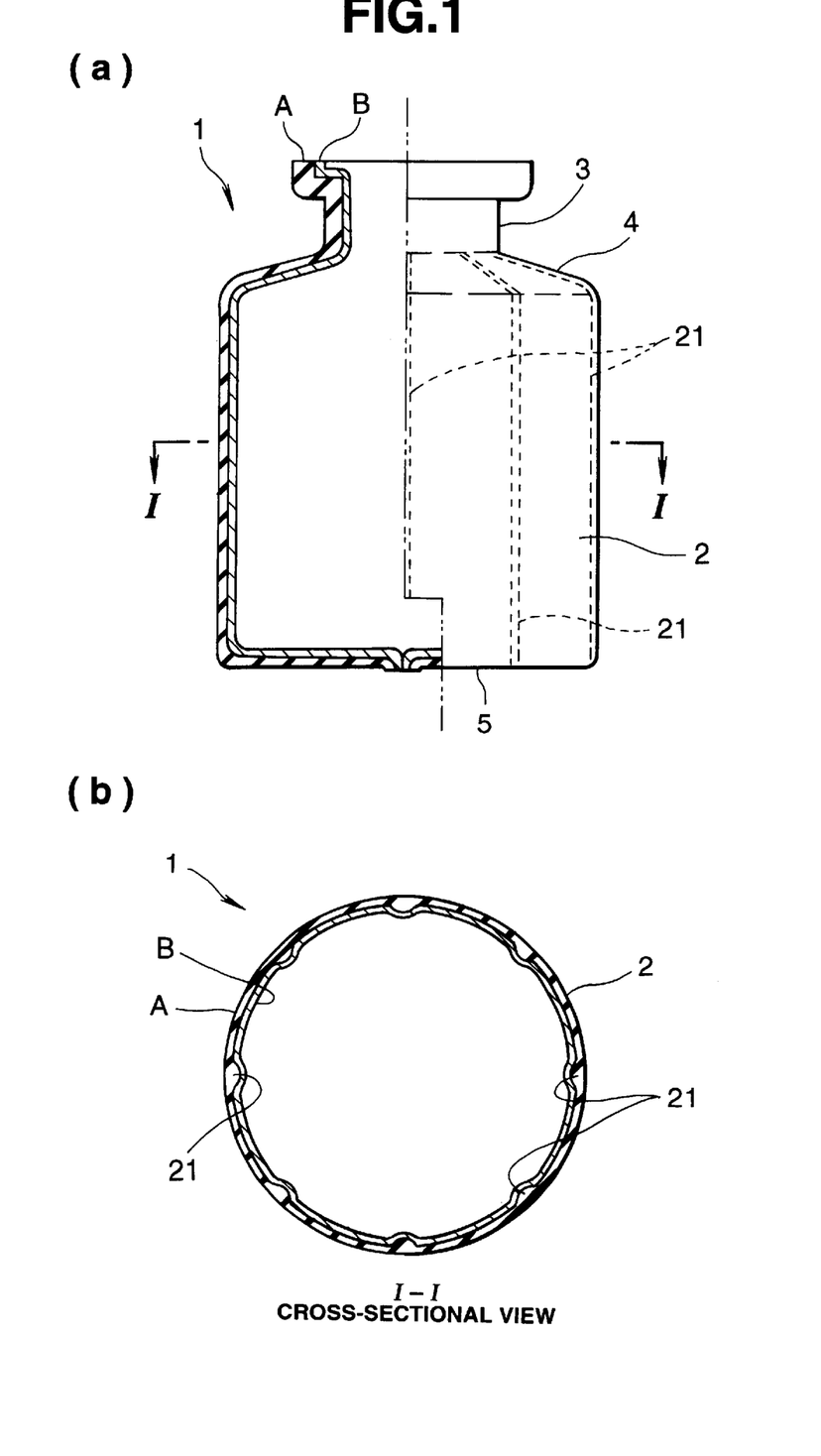
FIG. 1 is a partially broken-out side view, of a multilayered thin container according to the present invention, and is a horizontal sectional view of a cylindrical body thereof taken along the line I—I.
Figure 2:
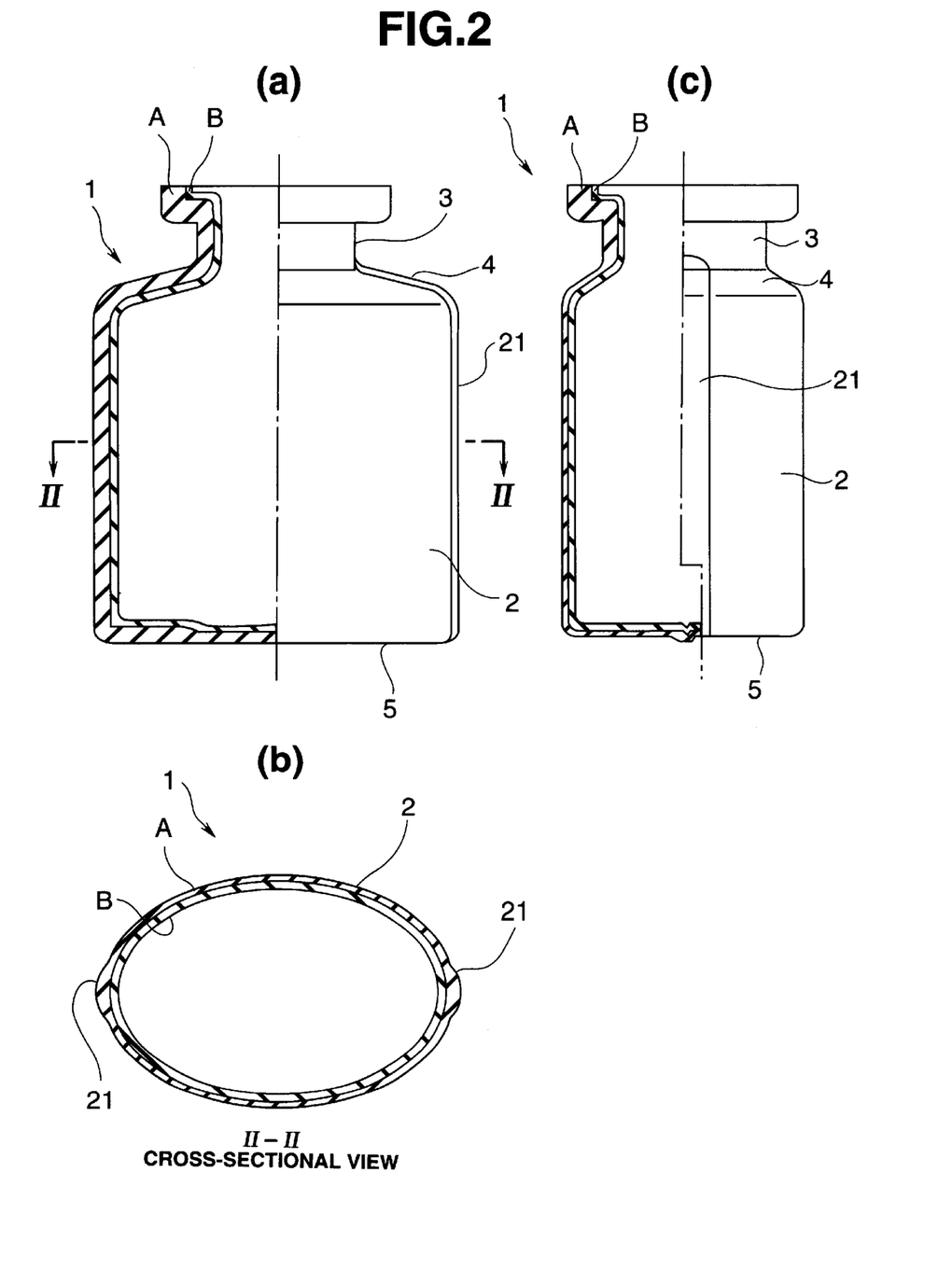
FIG. 2 is a partially broken-out side view, of another multilayered thin container according to the present invention, is a horizontal sectional view of a cylindrical body thereof taken along the line II—II, and is a partially broken-out front view of the container.

The multilayered thin container according to the present invention will be explained by referring to accompanying drawings. The multilayered thin container according to the present invention as designated by reference numeral (1) in FIGS. 1 and 2, is a thin-walled container having a multilayer structure which comprises a cylindrical body (2) and a neck (or mouth) portion (3) onto which a cap is fitted, and which is integrally formed by extrusion and blow molding. As a layer structure of the multilayered thin container (1), there may be adopted those having an appropriate number of layers such as 2 to 5 layers. As illustrated in FIGS. 1 and 2, the multilayered thin container (1) may include at least an outer layer (A) composed of a high-rigidity resin and an inner layer (B) composed of low-rigidity resin. The outer layer (A) serves for imparting a necessary rigidity to the container, and may be produced from resins having a specified elastic modulus. The lower limit of the elastic modulus of the outer layer is usually 1,500 kg/cm$^2$, preferably 2,000 kg/cm$^2$, and the upper limit thereof is usually 18,000 kg/cm$^2$, preferably 23,000 kg/cm$^2$. Namely, the elastic modulus of the outer layer is usually in the range of from 2,000 to 23,000 kg/cm$^2$. The inner layer (B) serves for imparting a liquid-discharging property and an easy collapse property to the container, and may be produced from resins having an elastic modulus of usually not more than 1,000 kg/cm$^2$, preferably 100 to 1,000 kg/cm$^2$.

In accordance with the present invention, as the high-rigidity resins for the outer layer (A), there may be used those resins which are produced using Philips catalysts or multistage Ziegler catalysts, for example, polyethylene having a melt flow rate (MFR) of 0.10 to 2.0 g/10 min and a density of 0.940 to 0.970 cm$^3$/g, or low-density polyethylene or linear low-density polyethylene having an MFR of 0.2 to 4.0 g/10 min and a density of 0.925 to 0.940 cm$^3$/g. As the high-rigidity resins, there may also be used polypropylene having a density of 0.885 to 0.935 cm$^3$/g. Such polypropylene is preferably in the form of a block copolymer having a rubber content of not less than 5%.

As the low-rigidity resins for the inner layer (B), there may be used those resins which are produced by a gas phase method, a liquid phase method or a solution method using a metallocene catalyst (single site catalyst), for example, polyethylene having a density of 0.860 to 0.910 cm$^3$/g (hereinafter occasionally referred to as "metallocene polyethylene resin"), or polyethylene resins containing the metallocene polyethylene resin in an amount of not less than 50% by weight.

The above-described low-rigidity resins are extremely uniform polymers having a very sharp molecular weight distribution (for example, Mw/Mn=2 to 3.5) and a very sharp composition distribution, and can exhibit not only excellent flexibility and chemical resistance, but also a high weldability to below-described gas-barrier resins. Also, in the case where mixed polyethylene containing not less than 50% by weight of the metallocene polyethylene resin and less than 50% by weight of ordinary low-density polyethylene is used, it becomes possible to further enhance a moldability thereof.

Various combinations of high-rigidity resins for the outer layer (A) and the low-rigidity resins for the inner layer (B) may be used in the present invention. In the especially preferred embodiment of the present invention, from the standpoint of the heat resistance required upon heat sterilization of the container, as the high-rigidity resins for the outer layer (A), there may be used polypropylene having a density of 0.880 to 0.920 cm$^3$/g or high-density polyethylene having a density of 0.950 to 0.967 cm$^3$/g; and as the low-rigidity resins for the inner layer (B), there may be used polyethylene produced using a metallocene catalyst and having a density of 0.860 to 0.910 cm$^3$/g, or polyethylene resins containing the metallocene polyethylene resin in an amount of not less than 50% by weight.

In the multilayered thin container (1) according to the present invention, when extrusion-molding to form the parison, the amount of the high-rigidity resin extruded for a portion corresponding to the neck portion (3) may be increased as compared to that corresponding to the cylindrical body (2), thereby making the rigidity of the neck portion (3) to a higher value than that of the cylindrical body (2). As a result, the neck portion (3) can exhibit a rigidity enough to be fitted with a cap (not shown), and the cylindrical body (2) can exhibit a flexibility enough to be almost completely collapsed after discharging a filled material therefrom. Incidentally, as the caps to be fitted, there may be used screw-type caps as well as seal-type caps or plug-type caps.

The neck portion (3) may be formed into an appropriate shape according to configuration of the cap used. For example, as shown in FIG. 1(a), the neck portion may be formed into a tubular shape having a flange projecting outwardly from an upper end thereof. In addition, although not shown, the neck portion may also be formed into a straight tubular shape having a male thread therearound. The thickness of the neck portion (3) of the multilayered thin container (1) is usually about 1.5 to about 4.0 mm, and 20 to 99% of the thickness thereof is constituted by the outer layer (A) composed of high-rigidity resin.

The cylindrical body (2) may be formed into any appropriate shape in horizontal section according to intended applications of the container, such as a circular shape, an ellipsoidal shape, a flat and approximately ellipsoidal shape, an approximately square shape or the like. The thickness of the cylindrical body (2) including a shoulder portion (4) and a bottom portion (5) except for the neck portion (3) (thickness of a portion except for ribs (21) as described hereinafter) is usually not more than 2.0 mm, i.e., preferably about 0.5 to 2.0 mm, more preferably 0.3 to 2.0 mm, still more preferably 0.3 to 1.5 mm, and 1 to 50% of the thickness of the cylindrical body is constituted by the outer layer (A) composed of high-rigidity resin.

Further, in the multilayered thin container (1) according to the present invention, when extrusion-molding to form the parison, the amount of the high-rigidity resin extruded for a portion corresponding to the bottom portion (5) may be increased as compared to that corresponding to the cylindrical body (2), thereby making the rigidity of the bottom portion (5) to a higher value than that of the cylindrical body (2). Namely, by allowing the bottom portion (5) to exhibit a higher rigidity than that of the cylindrical body (2), the container can surely maintain a good setting stability and a good standing property.

Further, in the multilayered thin container (1) according to the present invention, when extrusion-molding to form the parison, the outer layer composed of high-rigidity resin is extruded into such a sectional shape with a plurality of protrusions (21p) arranged in the circumferential direction (refer to the sectional shape of the parison shown in FIG. 6), thereby forming on the cylindrical body (2), a plurality of ribs (21) composed of high-rigidity resin and extending along an axis thereof, as shown in FIG. 1. As a result, the ribs (21) can impart a necessary rigidity to the cylindrical body (2), and the cylindrical body (2) can be further reduced in thickness of a portion other than the ribs (21). In addition, the parison itself as an intermediate product can exhibit a high shape-retention property and can be further enhanced in moldability upon the blow molding process.

The ribs (21) which are finally formed on the cylindrical body (2) by the blow-molding process, may have an approximately semi-circular shape or an approximately triangular shape in section. The height of each rib (21) is usually about 5 to 50% based on the whole thickness of the cylindrical body (2). The number of the ribs (21) is about 2 to 8. Meanwhile, the shape or the projecting height of the ribs (21) may be usually determined by a core (62) in the two-layer molding die described hereinafter and a resin path defined by a inner ring (63) and an extrusion ring (64).

Figure 3:
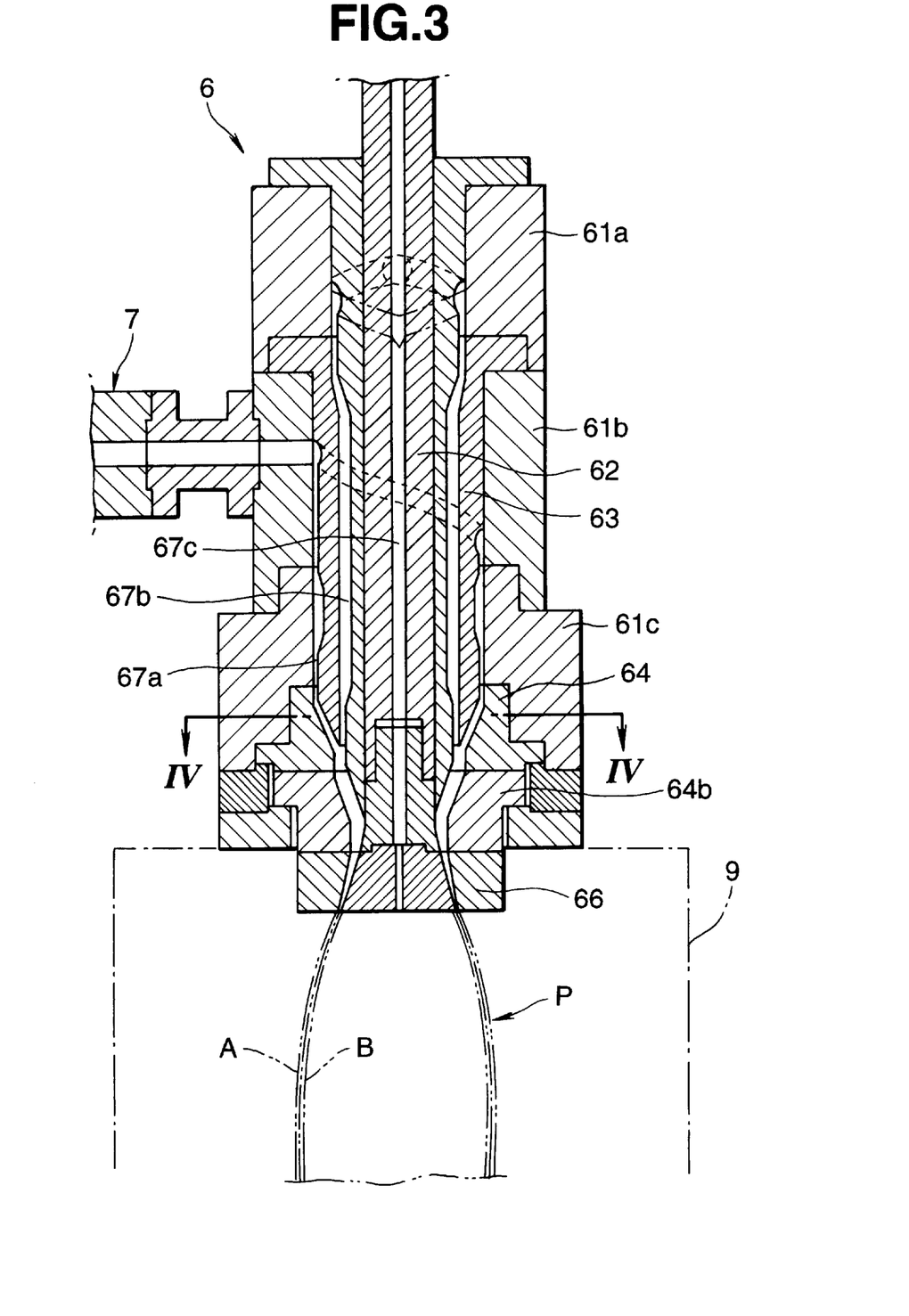
FIG. 3 is a vertical sectional view of an extrusion-molding machine for forming a parison used for blow-molding the multilayered thin container.
Figure 4:
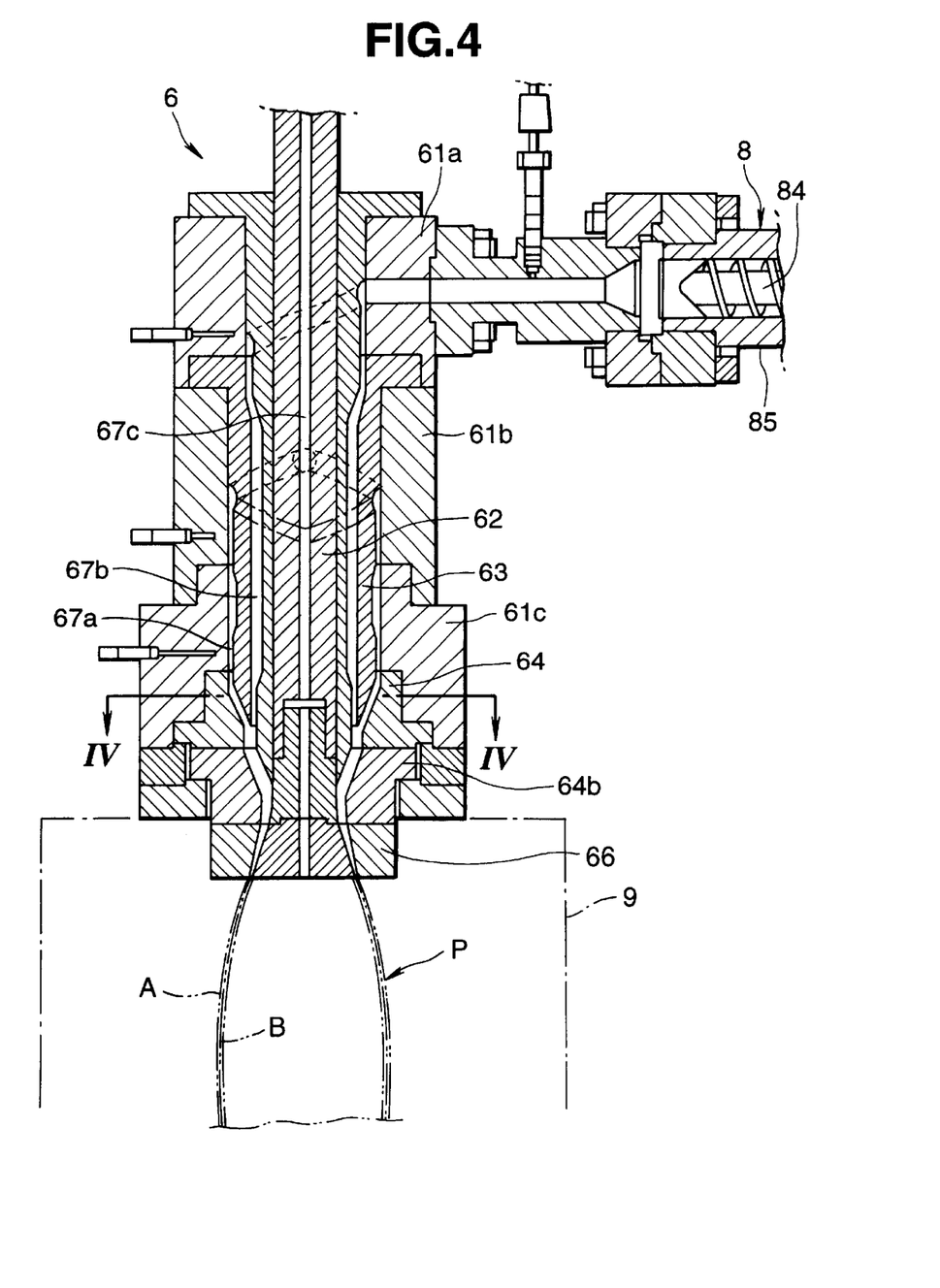
FIG. 4 is a vertical sectional view of the extrusion-molding machine shown in FIG. 3 which is viewed from the direction being different by an angle of 90° from that of FIG. 3.

The multilayered thin container (1) according to the present invention can be produced by: extrusion-molding to form a two-layer parison (P) including the outer layer (A) and the inner layer (B) using an extrusion-molding machine (6) as shown in FIGS. 3 and 4; and then blow-molding the obtained parison (P) in a blow-molding die (not shown) of a blow-molding machine (9) continuously coupled to the extrusion-molding machine (6). The extrusion-molding machine (6) for forming the parison (P) is constituted as a two-layer molding die as shown in FIGS. 3 and 4 to which a first extruder (7) for feeding a high-rigidity resin and a second extruder (8) for feeding a low-rigidity resin are coupled.

As the first extruder (7) and the second extruder (8), there may be used not only an accumulator-type extruder but also, for example, a screw in-line type extruder as shown in the figures. As shown in FIG. 4, the second extruder (8) comprises a screw (84) for extruding a resin, and a screw cylinder (85) accommodating the screw therewithin. The first extruder (7) as shown in FIG. 3 has the substantially same structure as that of the second extruder. The rotational speed of each screw of the first and second extruders (7) and (8) is inverter-controlled by a parison thickness controller (not shown), so that the amount of resins extruded can be locally increased or decreased.

As shown in FIGS. 3 and 4, the extrusion-molding machine (6) includes as main components, die heads (61a) to (61c) constituting an outer die part of the machine, a core (62) centrally inserted into the die heads, an inner ring (63) inserted between the die heads (61a, 61b . . . ) and the core (62), an extrusion ring (64) fitted around an outer periphery of a lower end portion of the inner ring (63) and at a lower end of the die head (61c), a tip-side extrusion ring (64b), and a die bush (66) continuously coupled to the lower end of the tip-side extrusion ring (64b).

The core (62) includes a fixed mandrel provided with an air passage (67c) extending along a central axis thereof, a movable adjustable mandrel for defining a resin path located on an outer peripheral side thereof, and several tip-end blocks positioned at a center of the tip-side extrusion ring (64b) or the die bush (66) for defining the resin path. The tip end portion of the inner ring (63) has a tapered outer peripheral surface whose diameter is gradually reduced toward the lower end thereof, and partially inserted into a region where a similarly-inclined tapered inner peripheral surface of the extrusion ring (64) is located.

Between the die heads (61b, 61c) plus the extrusion ring (64) and the inner ring (63), there is formed a resin path (67a) through which the high-rigidity resin fed from the first extruder (7) is extruded. Whereas, between the movable mandrel of the core (62) and the inner ring (63), there is formed a resin path (67b) through which the low-rigidity resin fed from the second extruder (8) is extruded. The resin path (67a) and the resin path (67b) are merged together on the lower side of the extrusion ring (64).

The resins which are extruded through the resin paths (67a, 67b), respectively, and which are different in rigidity from each other, are integrated together in a layered condition in the extrusion ring (64). The thus integrated resin is extruded through a gap defined by the tip end blocks of the core (62) and the tip-side extrusion ring (64b) plus the die bush (66), and then extruded from the lower end of the die bush (66) to the blow-molding machine (9). Air or an inert gas is fed through the air passage (67c) of the core (62), so that the parison (P) having a two-layered structure is formed within the blow-molding die of the blow-molding machine (9).

Figure 5:
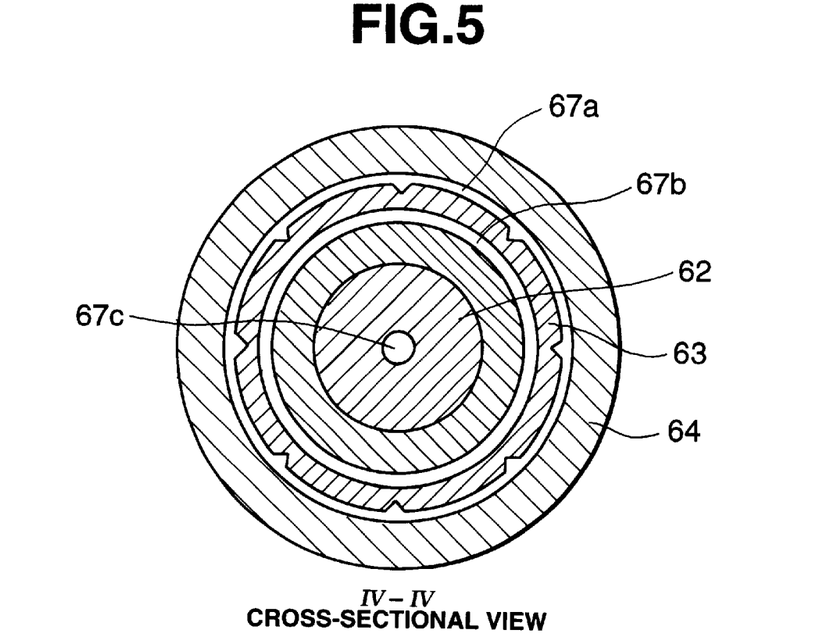
FIG. 5 is a horizontal sectional view of a two-layer molding die of the extrusion-molding machine for forming the parison.
Figure 6:
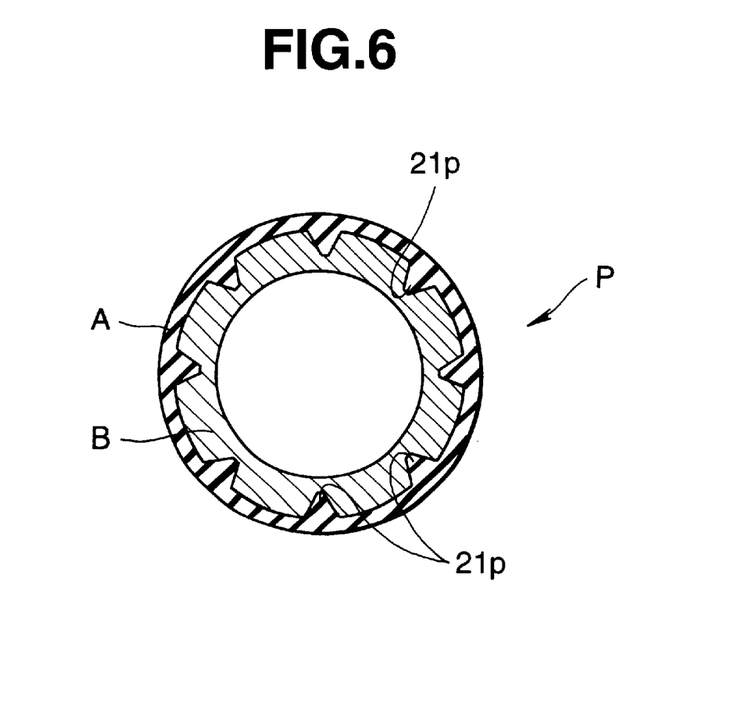
FIG. 6 is a horizontal sectional view of the parison extrusion-molded through the two-layer molding die shown in FIG. 5.

Incidentally, in the extrusion-molding machine (6), a specific die structure is adopted in order to obtain the parison (P) as shown in FIG. 6. That is, as shown in FIG. 5, the inner ring (63) has notches on an outer periphery thereof which are arranged in the circumferential direction at a constant pitch, whereby the resin path (67a) formed between the extrusion ring (64) and the inner ring (63) is increased in width at a constant pitch. With this arrangement, the amount of the high-rigidity resin extruded through the resin path (67a) is partially increased, so that protrusions (21p), for example, eight protrusions are formed on an inner peripheral surface of the outer layer (A) when the parison (P) extruded through the die bush (66) is viewed sectionally.

When extrusion-molding to form such a parison (P), the thicknesses of the outer layer (A) and the inner layer (B) may be controlled to specific values by adjusting flow rates of these resins, especially a flow rate of the high-rigidity resin, by the parison thickness controller. More specifically, the rotational speed of the screw of the first extruder (62) is inverter-controlled by the parison thickness controller, thereby increasing the amount of the high-rigidity resin extruded for the portion corresponding to the bottom portion (5) of the container as compared to that corresponding to the cylindrical body (2), or increasing the amount of the high-rigidity resin extruded for the portion corresponding to the neck portion (5) of the container as compared to that corresponding to the cylindrical body (2).

As a result, the parison (P) extruded into the blow-molding die can be increased in thickness of those portions corresponding to the bottom portion (5) and the neck portion (3). The thus obtained parison (P) can exhibit a high melt tension as a whole and an excellent shape retention property against a tare weight thereof, since the outer layer (A) composed of high-rigidity resin is provided thereon. Further, since the parison (P) extruded through the above specific die structure has the outer layer (A) on which the ribs composed of high-rigidity resin are previously formed, the parison (P) can exhibit a more excellent shape-retention property by the above ribbed structure. Such a parison (P) extruded into the blow-molding die is blow-molded by an ordinary method, thereby obtaining the above-described multilayered thin container (1). In addition, since the parison (P) can exhibit an excellent shape-retention property as described above, the moldability of the parison upon blow-molding can be further enhanced.

In the thus obtained multilayered thin container (1), with this arrangement that the rigidity of the neck portion (3) is higher than that of the cylindrical body (2), the cylindrical body (2) can maintain a good flexibility and a cap can be fitted onto the neck portion (3). That is, in the multilayered thin container (1) according to the present invention, since the neck portion (3) has a larger thickness and a higher rigidity, the cap can be readily and surely fitted onto the neck portion (3). Further, when the thickness and rigidity of the bottom portion (5) are increased, the obtained container can be enhanced in setting stability and standing property.

Besides, the ribs composed of high-rigidity resin can serve for imparting a necessary rigidity to the cylindrical body (2) when the container is supplied with any material to be filled. Therefore, in the multilayered thin container (1) according to the present invention, portions of the cylindrical body (2) other than the ribs (21) can be further reduced in thickness, thereby further enhancing the liquid-discharging property and the easy collapse property. Further, since the multilayered thin container (1) according to the present invention can be integrally formed by a series of the above-described extrusion and blow molding steps of the parison, the production process becomes extremely simplified. In addition, since it is unnecessary to weld a separate neck member, etc., onto the container, the occurrence of pin holes can be surely prevented.

Figure 7:
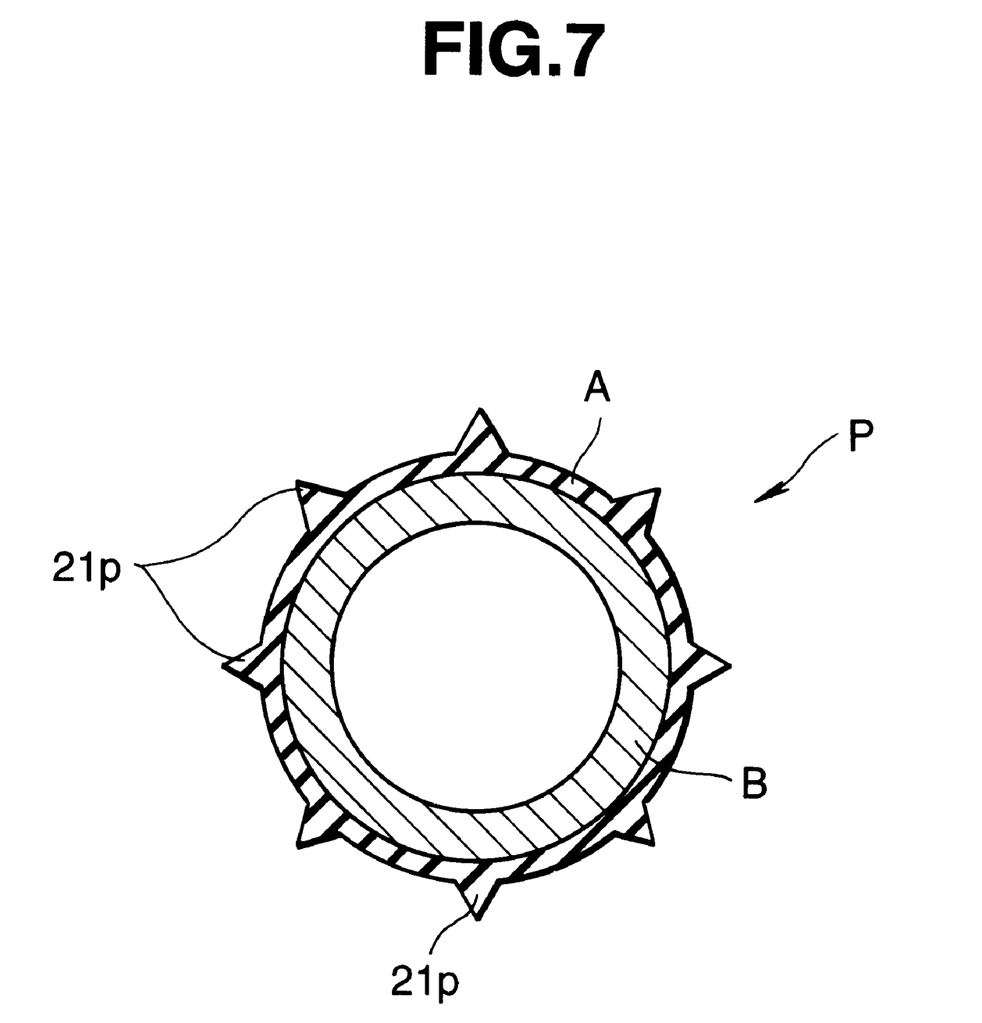
FIG. 7 is a horizontal sectional view of a parison extrusion-molded through the other two-layer molding die.

In the multilayered thin container (1) according to the present invention, the parison may also be extrusion-molded into such a sectional shape as shown in FIG. 7 in which the outer layer (A) composed of high-rigidity resin is formed with a plurality of protrusions (21p) arranged in the circumferential direction and on an outer periphery thereof, thereby forming on the cylindrical body, a plurality of ribs extending along an axis thereof in the same manner as in the above-described embodiment. The protrusions (21p) of the parison (P) as shown in FIG. 7 can be obtained by providing grooves on each inner peripheral surface of the extrusion ring (64), the tip-side extrusion ring (64b) and the die bush (66) in the extrusion-molding machine (6). As a result, similarly to the above embodiment, it becomes possible to impart a necessary rigidity to the cylindrical body (2), so that the cylindrical body (2) can be further reduced in thickness of portions other than the ribs. In addition, since the parison itself can be enhanced in shape-retention property, the moldability of the parison upon blow molding can be improved.

Figure 8:
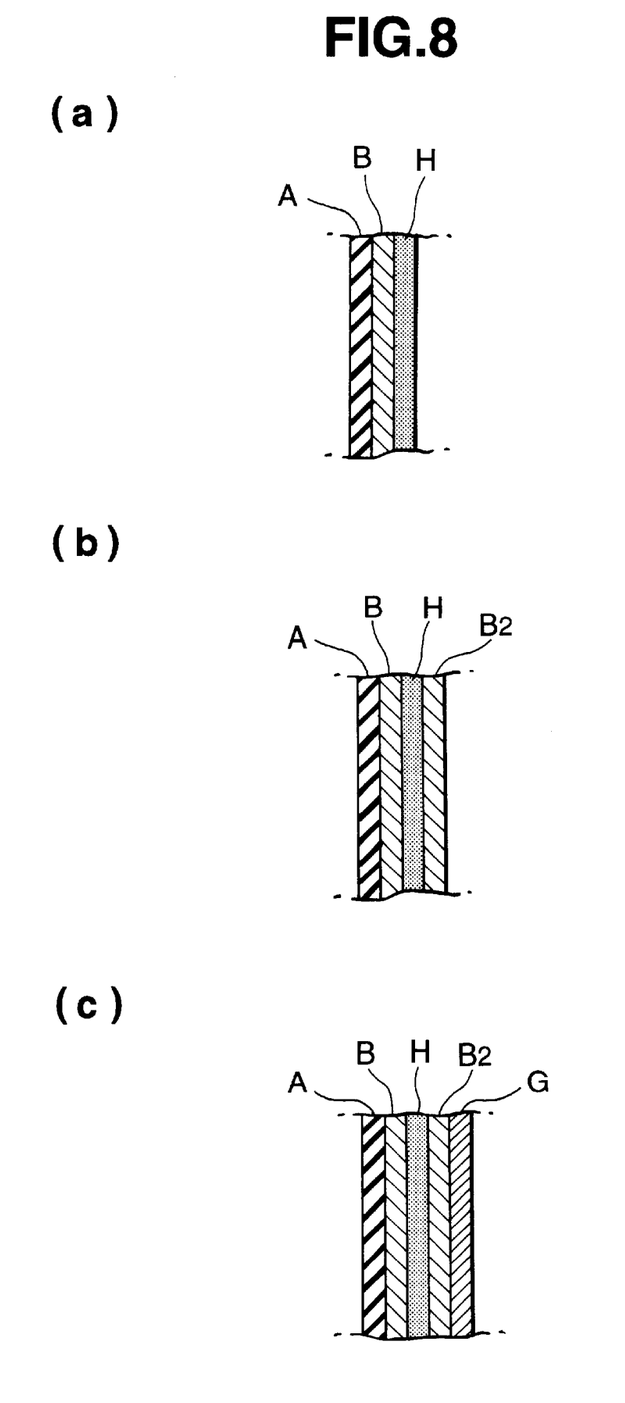
FIGS. 8 is sectional views of the other multilayered thin containers having different layered structures.

Also, in the multilayered thin container (1) according to the present invention, a gas-barrier layer composed of gas-barrier resins may be provided therein. As the gas-barrier resins, there may be used an ethylene-vinyl alcohol copolymer, a polyamide or a polyethylene naphthalate. More specifically, as shown in FIG. 8, there may be provided such a three-layered structure comprising an outer layer (A) composed of high-rigidity resin, an inner layer (C) composed of low-rigidity resin, and a gas-barrier layer (H) as an innermost layer. In the multilayered thin container (1) having the three-layered structure as shown in FIG. 8(a), since the gas-barrier layer (H) serves for inhibiting the permeation of oxygen, it is possible to preserve the content filled in the container without deterioration in quality thereof.

As the other layered structure, as shown in FIG. 8(b), there may be exemplified a four-layered structure comprising an outer layer (A) composed of high-rigidity resin, a first inner layer (B) composed of low-rigidity resin, a gasbarrier layer (H) and a second inner layer (B2) as an innermost layer composed of low-rigidity resin. Further, as the still other layered structure, as shown in FIG. 8(c), there may be exemplified a five-layered structure comprising an outer layer (A) composed of high-rigidity resin, a first inner layer (B) composed of low-rigidity resin, a gas-barrier layer (H), a second inner layer (B2) composed of low-rigidity resin, and an innermost layer (G) composed of the other resins. In these multilayered thin containers having a four-or five-layered structure, when polyethylene produced using a metallocene catalyst is used as materials for the first and second inner layers (B) and (B2), the weldability between these inner layers and the gas-barrier layer (H) can be enhanced.

Further, in the multilayered thin containers (1) according to the respective embodiments shown in FIGS. 1, 2 and 8, in the case where the inner layer (B) is composed of polyethylene produced using the metallocene catalyst, the content filled in the container can be safely and surely preserved because the container can exhibit a high chemical resistance. Accordingly, the multilayered thin container (1) according to the present invention can be suitably used as medical transfusion containers, food containers, beverage containers or the like.

As described above, in the multilayered thin container according to the present invention, since the neck portion has a large thickness and a high rigidity, a cap can be readily and surely fitted thereon. In addition, in the multilayered thin container according to the present invention, since the parison extruded into a specific sectional shape exhibits an excellent shape-retention property, it is possible to enhance the moldability thereof upon blow-molding. Further, since the ribs composed of high-rigidity resin and formed on the cylindrical body can impart a necessary rigidity to the cylindrical body, the thickness of the cylindrical body can be further reduced, and the container can be further enhanced in liquid-discharging property and easy collapse property.

Since the whole part of the multilayered thin container according to the present invention can be integrally formed by extrusion and blow molding, the production process becomes extremely simplified, and since it is unnecessary to weld separate parts such as a neck member onto the container, the occurrence of pin holes can be surely prevented. Further, in the case where the inner layer is composed of polyethylene produced using a metallocene catalyst, the container is further enhanced in chemical resistance, so that the content filled in the container can be safely and surely preserved.

Industrial Applicability

The multilayered thin container according to the present invention comprises a flexible cylindrical body and a high-rigidity neck portion to which a cap is fitted, and can be integrally formed by a blow-molding method. Therefore, the container can be suitably used as medical transfusion containers, food containers, beverage containers or the like.

What is claimed is:

1. A multilayered thin container comprising a cylindrical body and a neck portion for cap-fitting, which container is integrally formed by extrusion and blow molding, which container comprises an outer layer composed of a rigidity resin (i) having an elastic modulus of 2,000 to 23,000 kg/cm² and an inner layer composed of a rigidity resin (ii) having an elastic modulus of not more than 1,000 kg/cm², wherein when extrusion-molding to form a parison, the amount of the rigidity resin (i) extruded for a portion corresponding to said neck portion is increased as compared to that corresponding to the cylindrical body so as to allow said neck portion to exhibit a higher rigidity than that of said cylindrical body; and said outer layer composed of the rigidity resin (i) is extruded into a sectional shape with a plurality of protrusions arranged along the circumferential direction, whereby said cylindrical body is formed with a plurality of ribs composed of the rigidity resin (i) and extending along an axis thereof.

2. A multilayered thin container according to claim 1, wherein when extrusion-molding to form the parison, the amount of the rigidity resin (i) extruded for a portion corresponding to a bottom portion of the container is increased as compared to that corresponding to said cylindrical body so as to allow said bottom portion to exhibit a higher rigidity that of said cylindrical body.

3. A multilayered thin container according to claim 1 wherein the thickness of said cylindrical body is 0.3 to 2.0 mm.

4. A multilayered thin container according to claim 1, wherein the thickness of the outer layer composed of the rigidity resin (i) at said neck portion is 20 to 99% based on the whole thickness of the neck portion, and the thickness of the outer layer composed of the rigidity resin (i) at said cylindrical body is 1 to 50% based on the whole thickness of the cylindrical body.

5. A multilayered thin container according to claim 1, wherein said rigidity resin (i) is polyethylene having a melt flow rate of 0.10 to 2.0 g/10 min and a density of 0.940 to 0.970 cm³/g, or low-density polyethylene or linear low-density polyethylene having a melt flow rate of 0.2 to 4.0 g/10 min and a density of 0.925 to 0.940 cm³/g; and said rigidity resin (ii) is polyethylene produced using a metallocene catalyst and having a density of 0.860 to 0.910 cm³/g or a polyethylene resin containing said polyethylene produced using a metallocene catalyst in an amount of not less than 50% by weight.

6. A multilayered thin container according to claim 1, wherein said rigidity resin (i) is polypropylene having a density of 0.885 to 0.935 cm³/g; said rigidity resin (ii) is polyethylene produced using a metallocene catalyst and having a density of 0.860 to 0.910 cm³/g or a polyethylene resin containing said polyethylene in an amount of not less than 50% by weight.

7. A multilayered thin container according to claim 1, which further comprises a gas-barrier layer composed of a gas-barrier resin.

8. A multilayered thin container according to claim 7, wherein said gas-barrier resin is ethylene-vinyl alcohol copolymer, polyamide or polyethylene naphthalate.

* * * * *